United States Patent [19]

Pribnow

[11] Patent Number: 4,754,398
[45] Date of Patent: Jun. 28, 1988

[54] SYSTEM FOR MULTIPROCESSOR COMMUNICATION USING LOCAL AND COMMON SEMAPHORE AND INFORMATION REGISTERS

[75] Inventor: Richard D. Pribnow, Chippewa Falls, Wis.

[73] Assignee: Cray Research, Inc., Minneapolis, Minn.

[21] Appl. No.: 750,487

[22] Filed: Jun. 28, 1985

[51] Int. Cl.$^4$ .............................................. G06F 15/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,348,210 | 10/1967 | Ochsner | 364/200 |
| 3,528,062 | 9/1970 | Lehman et al. | 364/200 |
| 3,566,357 | 2/1971 | Ling | 364/200 |
| 3,573,736 | 4/1971 | Schlaeppi | 364/200 |
| 3,643,227 | 2/1972 | Smith et al. | 364/200 |
| 3,833,889 | 9/1974 | Cray | 364/200 |
| 3,916,383 | 10/1975 | Malcolm | 364/200 |
| 4,047,161 | 9/1977 | Davis | 364/200 |
| 4,073,005 | 2/1978 | Parkin | 364/200 |
| 4,104,720 | 8/1978 | Gruner | 364/200 |
| 4,128,880 | 12/1978 | Cray, Jr. | 364/200 |
| 4,145,738 | 3/1979 | Inoue et al. | 364/200 |
| 4,270,181 | 5/1981 | Tanakura et al. | 364/736 X |
| 4,280,176 | 7/1981 | Tan | 364/200 |
| 4,293,941 | 10/1981 | Muraoka et al. | 364/200 |
| 4,310,879 | 1/1982 | Pandeya | 364/200 |
| 4,365,292 | 12/1982 | Barnes et al. | 364/200 |
| 4,374,410 | 2/1983 | Sakai et al. | 364/200 |
| 4,380,798 | 4/1983 | Shannon et al. | 364/200 |
| 4,392,200 | 7/1983 | Arulpragasam et al. | 364/200 |
| 4,394,725 | 7/1983 | Bienvenu et al. | 364/200 |
| 4,394,727 | 7/1983 | Hoffman et al. | 364/200 |
| 4,394,730 | 7/1983 | Suzuki et al. | 364/200 |
| 4,400,769 | 8/1983 | Kaneda et al. | 364/200 |
| 4,402,046 | 8/1983 | Cox et al. | 364/200 |
| 4,435,765 | 3/1984 | Uchida et al. | 364/200 |
| 4,435,792 | 3/1984 | Bechtolsheim | 365/230 |
| 4,442,487 | 4/1984 | Fletcher et al. | 364/200 |
| 4,480,304 | 10/1984 | Carr et al. | 364/200 |
| 4,489,381 | 12/1984 | Lavellee et al. | 364/200 |
| 4,490,786 | 12/1984 | Nakatani | 364/200 |
| 4,493,027 | 1/1985 | Katz et al. | 364/200 |
| 4,507,728 | 3/1985 | Sakamoto et al. | 364/200 |
| 4,517,640 | 3/1985 | Hattori et al. | 364/200 |
| 4,636,942 | 1/1987 | Chen et al. | 364/200 |

Primary Examiner—Archie E. Williams, Jr.
Assistant Examiner—Florin Munteanu
Attorney, Agent, or Firm—Merchant, Gould, Smith, Edell, Welter & Schmidt

[57] ABSTRACT

An interprocessor communication system for a multiprocessor data processing system includes a common control circuit which includes a plurality of clusters where each cluster includes a plurality of semaphore registers and a plurality of information registers. Each type of register may be directly addressed by any processor. Each processor has a cluster code indicative of which, if any, of the clusters the processor may access. Each processor has a local control circuit in relatively close physical proximity and each local control circuit can communicate with the other local control circuits to determine whether one of its counterparts is requesting an operation. The local control circuit monitors and controls the issuance of the processor's instructions to the common control circuit. The local control circuit includes a plurality of local semaphore registers maintained with a copy of data in the common semaphore register cluster associated with that processor. The local control circuit further includes means for testing the status of a bit in the local semaphore register in response to a processor instruction requesting that the corresponding bit in the common control circuit be test and set, and for providing for the immediate issue of the instruction in the case where the bit is clear and the instruction may issue. The local control circuit also has the capability of generating a deadlock interrupt to accomodate the execution of a multiprocessing task by a single processor and to eliminate the possibility of a processor holding issue on a test and set instruction indefinitely.

4 Claims, 4 Drawing Sheets

SYSTEM FOR MULTIPROCESSOR COMMUNICATION USING LOCAL AND COMMON SEMAPHORE AND INFORMATION REGISTERS

TECHNICAL FIELD OF THE INVENTION

The present invention pertains to the field of high speed digital data processors, and more particularly to multiprocessor systems.

BACKGROUND OF THE INVENTION

The present invention pertains to a communication circuit for a multiprocessor system for multitasking applications. The system provides that independent tasks of different jobs or related tasks of a single job may be run on multiple processors. Typical inter-CPU communication in prior art machines is accomplished throughout the main memory, in a "loosely coupled" manner. Inter-CPU communication of this nature is hampered by the need to repetitively resort to relatively slow main or central memory references, and by access conflicts between the processors. The multiprocessor communication system of the present invention overcomes the substantial delays and software coordination problems associated with loosely coupled multiprocessing by providing a "tight-coupling" communications circuit between the CPUs which is independent of the shared or central memory.

The tight-coupling communication circuits of the present invention provide a set of shared registers which may be accessed by either CPU at rates commensurate with intra-CPU operation. Thus, the shared registers provide a fast inter-CPU communication path to minimize overhead for multitasking of small tasks with frequent data interchange. The present multiprocessor system also provides that tasks may be coupled through the shared memory as provided by the prior art. However, the tight-coupling communications circuits provide a hardware synchronization device through which loosely coupled tasks as well as tightly-coupled tasks may be coordinated efficiently.

An example of a tight-coupling communication scheme is disclosed in U.S. Pat. No. 4,636,942. While that scheme is highly effective for a system in which the processors may be closely packed together, it was not designed with the alternate possibility in mind. The present invention is designed particularly for use in multiprocessor systems wherein the processors are physically separated by necessity such that common communication resources cannot be accessed by all processors without significant signal propagation delays.

SUMMARY OF THE INVENTION

The present invention provides an interprocessor communication system for a multiprocessor data processing system which includes a common control circuit including a plurality of semaphore registers which may be accessed by any one of the processors, and a plurality of information registers which may be addressed directly by any one of the processors. The semaphore registers and the information registers are organized into a plurality of clusters, with each of the processors having associated therewith a cluster code indicative of which, if any, of the clusters the processor may access. A local control circuit is associated with each processor and is in relatively close proximity thereto as compared to the common control circuit. The local control circuit monitors instructions to reference or alter registers in the common control circuit and controls the issue of such CPU instructions according to the availability of the common control circuit. The local control circuit includes a plurality of local semaphore registers maintained with a copy of the data in the common semaphore register cluster associated with the respective processor. The local control circuit further includes means for testing the status of a bit in the local semaphore register in response to a processor instruction requesting that the corresponding bit in the common control circuit be test and set, and for providing for the immediate issue of the instruction in the case where the bit is clear and the instruction may issue, whereby delays associated with communicating with the common control to determine the appropriateness of issuing the instruction are avoided. This and other aspects of the apparatus of the present invention, together with the method of communication of the present invention are discussed and described in more detail below with respect to the specification and drawing.

DETAILED DESCRIPTION OF THE INVENTION

Figure 1:
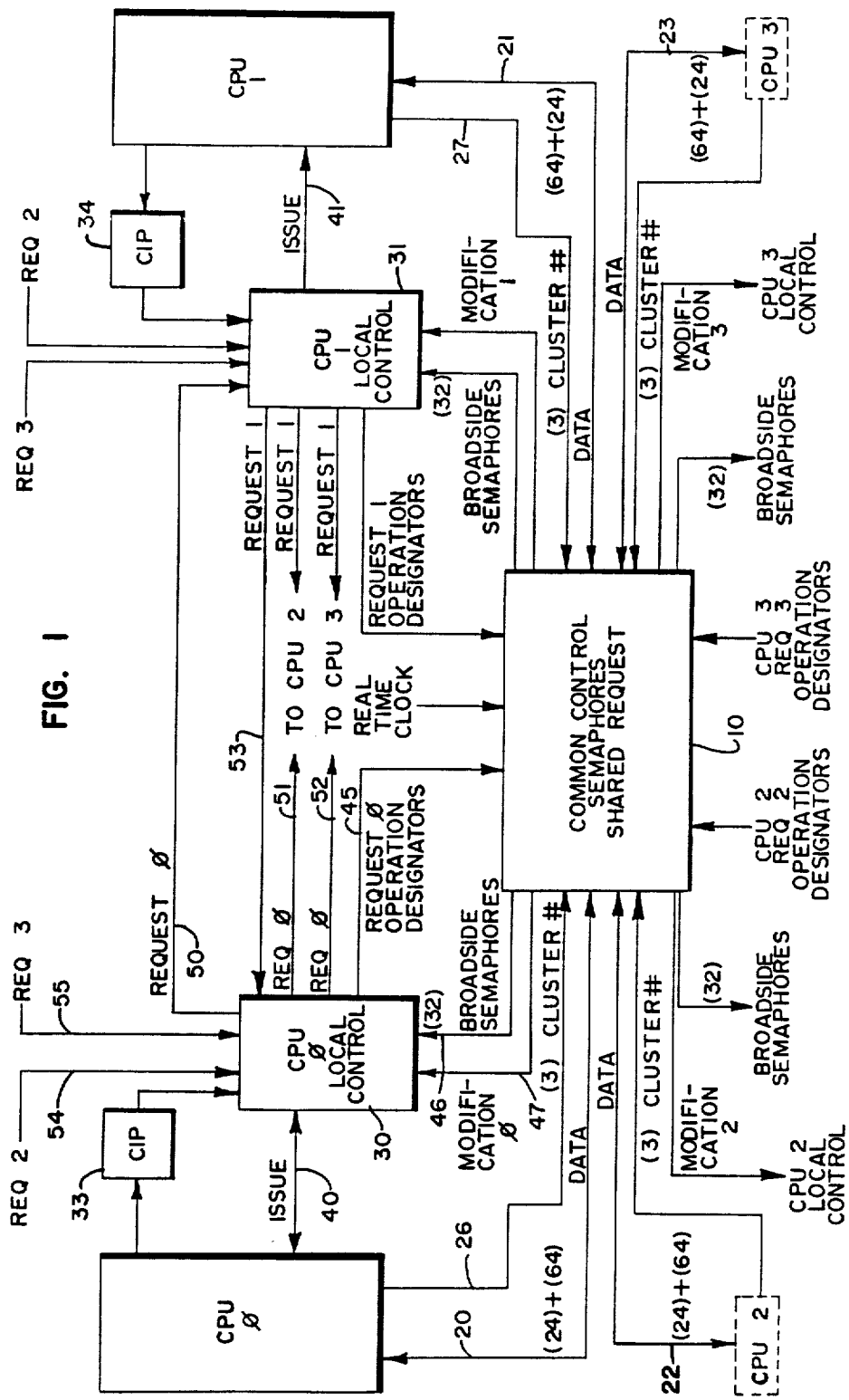
FIG. 1 is a block diagram of the overall organization of the communications circuit according to the present invention.

Referring to FIG. 1, the present invention is shown in schematic block diagram form. In the preferred embodiment the present invention is configured for communication between processors in a four CPU multiprocessor system. Because the communication circuit of the present invention is symmetrical, less than all the system is shown in order to be brief in the drawing. Specifically, that portion of the system corresponding specifically to CPU 0 and 1 and that portion of the system shared by all four CPUs is shown in full, while those corresponding components of the system respecting CPUs 2 and 3 have been omitted.

CPUs 0, 1, 2 and 3 may communicate through the common control circuit 10, which includes semaphore registers and shared registers, which may be accessed by the various processors as will be explained. Communication through the shared registers of common control 10 provides a fast and time efficient mechanism for passing data between processors, for instance loop counts, memory addresses and scalar constants. The semaphore registers are a further means for communicating between or synchronizing the processors and may be tested, set or cleared by any of the processors whereby, for example, data transfers through the shared registers or the central memory of the system (not shown) may be coordinated. A further explanation of the general utility of semaphore and share registers may be had with reference to the above-mentioned U.S. Pat. No. 4,636,942.

As shown in FIG. 1, each of the CPUs 0, 1, 2 and 3 is connected to circuit 10 via the respective data lines 20-23, each of which provides an 88 bit wide data path to and from the circuit 10. The CPUs are further connected to circuit 10 via signal paths 26-29, each of which carry a signal indicative of the "cluster number" to which the CPU is assigned, the significance of which will be explained in more detail below. Data paths 20-23 provide a conduit for the reading and writing of data in the shared registers circuit 10. Each CPU is also connected to the circuit 10 via a corresponding local control circuit, two of which are shown with respect to CPU 0 and CPU 1. In the preferred embodiment of the invention one or more CPU is physically displaced from the common control circuit 10 by about one clock period in signal propagation delay. On the other hand, the local control circuits, for instance 30 and 31, are in close physical proximity to the processor such that the local controls are essentially integral with the CPUs.

Local control circuits 30 and 31, corresponding to CPU 0 and 1 respectively, are each interfaced to their corresponding CPU through the respective current instruction parcel (CIP) registers 33 and 34 respectively. Registers 33 and 34 each receive instruction parcels from the CPUs which include instructions pertaining to operations directed to the semaphore registers or the shared registers of circuit 10. Issue of these instructions is controlled by local controls 30 and 31 via issue signals 40 and 41 respectively, as will be explained in more detail below. Each of local control circuits 30 and 31 are connected to the common control circuit 10 via three different signal paths. For example, with respect to local control 30 there is provided a request operation signal path 45, which conveys all information for operation requests to the circuit 10 from CPU 0 and CIP 33, a broadside semaphore signal path 46, via which the contents of semaphore registers in circuit 10 may be communicated to control 30, and finally a modification signal path 47 via which modifications to the associated semaphore registers and circuit 10 may be communicated to local control 30.

Each of the local controls also communicates with its counterparts in order to indicate when a request for an operation has been made to circuit 10. For example, with respect local control 30, there are provided signal paths 50, 51 and 52, via which it may communicate to the respective CPUs 1, 2 and 3 that a request is being made for an operation in the shared resources 10. Accordingly, each of the local controls remains appraised of whether or not one or more of its counterparts is requesting an operation, as for example shown with respect to control 30 signal paths 53-55, the importance of which will be explained in more detail below.

Figure 3:
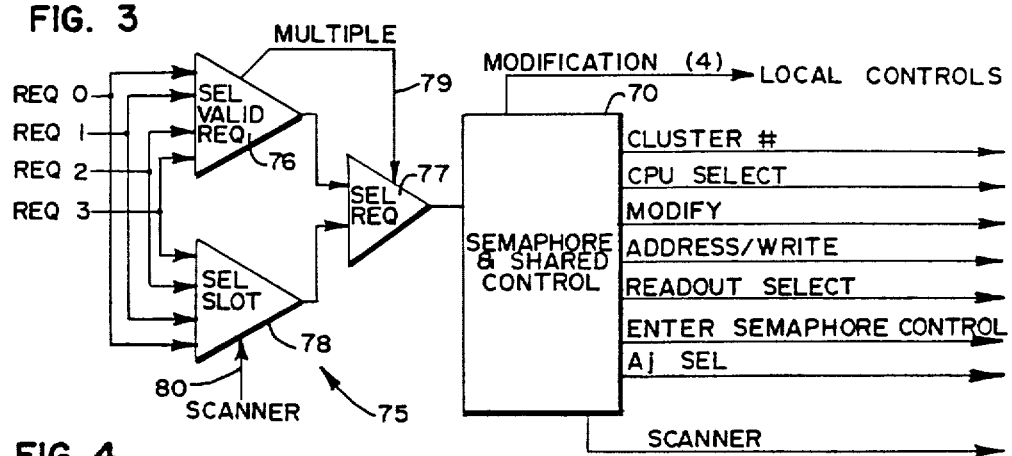
FIGS. 3, 4 and 5 are schematic block diagrams of the common control communications circuit according to the present invention.
Figure 4:
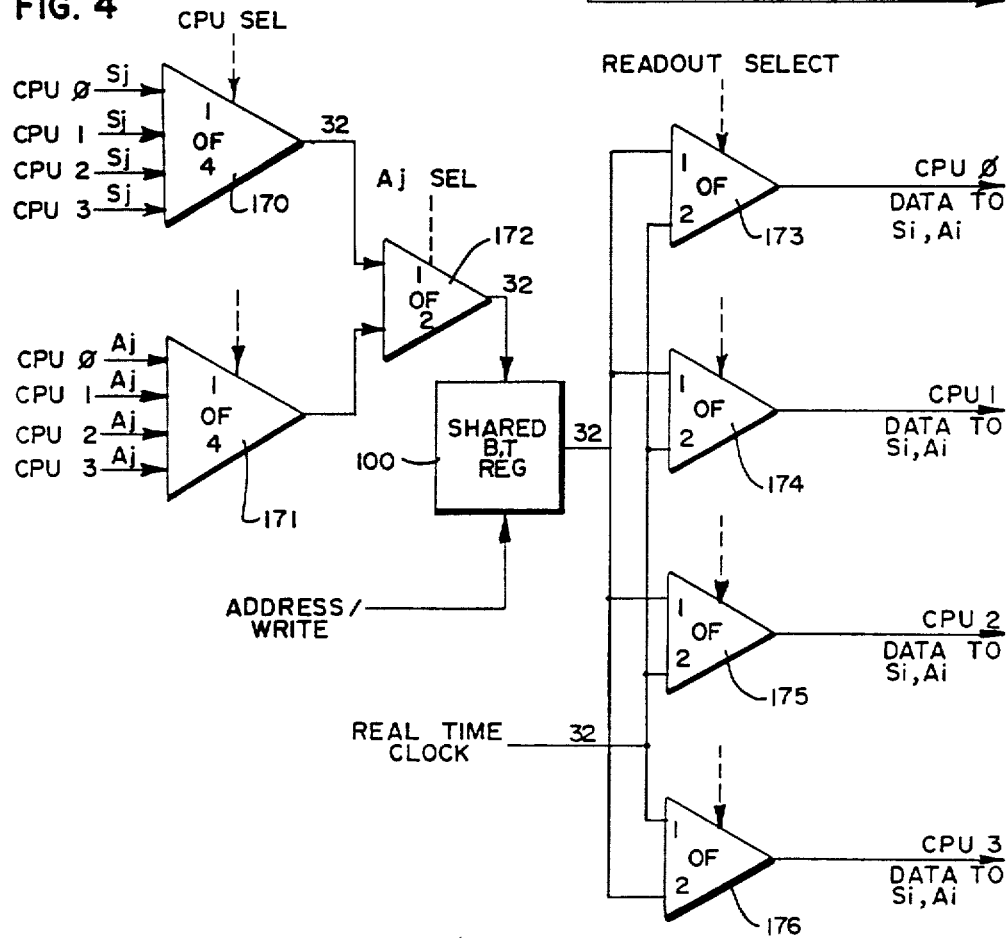
Figure 5:
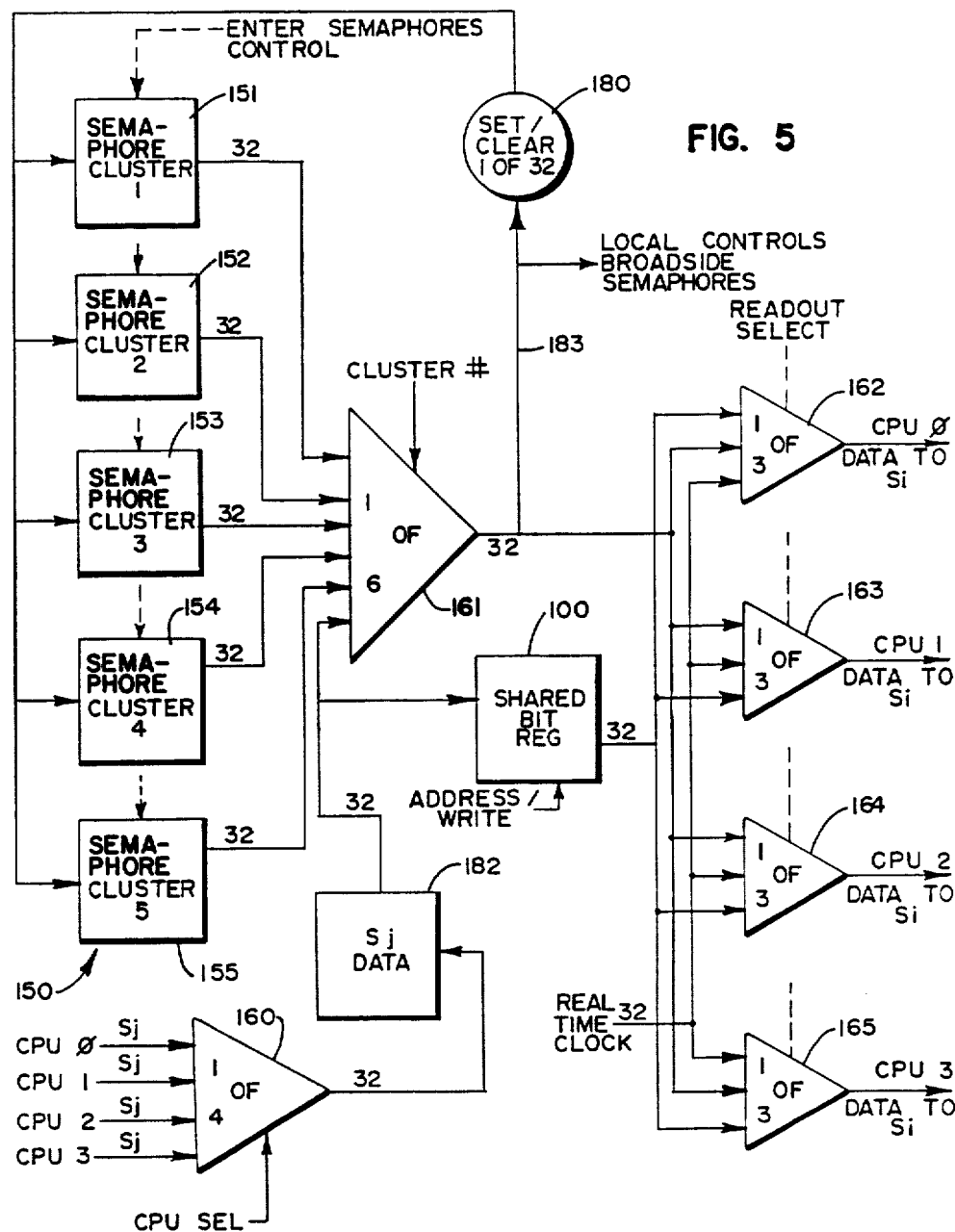

Referring now more specifically to FIGS. 3, 4, and 5 common control circuit 10 will be described in more detail. A semaphore and shared register control circuit 70 is provided, and receives operation requests from the CPUs via gating network 75. Network 75 includes a first gate 76 via which any one of four requests from a corresponding local control circuit may be gated through to gate 77, and a further gate 78 which also may gate any one of requests 0-3 through to gate 77. In the case where only one request is present at the inputs to gate 76 such as sensed by the gate, that request is selected, and is gated through gate 77 under the control of signal 79, to control 70. In the case where more than one request is present on the request lines, signal 79 causes gate 77 to pass the input received from gate 78 which selects one of the pending requests according to a scanner (time slot-revolving) signal 80. The request selected by network 75 contains all of the control necessary to complete the request.

No more than one request for an operation in a semaphore register or for a reference to the shared registers may be accomplished at a time. Moreover, as implemented in the present invention there is a one clock cycle delay for propagation between each CPU and circuit 10, which requires, as will be discussed more fully below, that no more than one operation be performed every two clock cycles. Once a request has been received at control 70, the particular operation desired is carried out. Referring to FIGS. 4 and 5, the interfacing of each of the CPUs with the shared registers and semaphore registers is shown in more detail. Shared registers 100 and semaphore registers 150 are each accessible in five clusters. Each cluster is comprised of thirty-two 1 bit semaphore registers, eight 24 bit B registers and eight 64 bit T registers. Access by a CPU to any one of these semaphore register clusters 1-5, 151-155 respectively, is accomplished via a multiplexing arrangement including gates 160-165. Access to shared registers 100 is through gates 160-165, and 170-176. The shared B and T registers 100 are preferably a memory module, with access to any one of the clusters within the registers being accomplished via selective addressing, with a portion of the address indicative of the cluster to be accessed.

Whether or not a cluster is accessible to a CPU, and if so which cluster is accessible is determined by the operating system and effected by assigning a cluster number to the job to be executed at start up. More particularly, the operating system loads the assigned cluster number into the jobs exchange package image in memory, which contains all the necessary information for switching program execution. As explained above, this cluster number is communicated via signal paths 26-29 (from a corresponding register in the CPUs) to circuit 10, and in particular control 70, via which access to the semaphores and shared registers may be controlled. Each of the cluster number registers associated with each CPU may be read or written during an exchange operation from a CPU data path, or may be manipulated by the operating system by instruction.

The cluster number assigned to a job may have one of six different values. The value of 0 denies access to any shared registers or semaphores. The value of 1, 2, 3, 4 or 5 permits the CPU to access the corresponding cluster. To accomplished tightly-coupled communication between currently operating CPUs, both must be assigned to the same cluster. If it is desired to execute a different job in each CPU or if only one CPU is available to execute a job coded for multiprocessing, access to a cluster may be limited to only one CPU. Cluster number 1 is typically reserved for the operating system which may run in any one of the processors, to provide operating system synchronization between processors. This provides maximum flexibility in utilizing the multiprocessor.

Software instructions are provided for utilization of the shared registers. These instructions enable communication with the semaphore registers 151-155 and access to the shared B and T registers 100. A set instruction is provided for unconditionally setting a semaphore bit. A clear instruction is provided for unconditionally clearing a semaphore register. As will be explained below, a test and set instruction is provided and operates with respect to both the local controls and common controls. The CIP registers, for example 33 and 34, receive these instructions, and convey them to the local control circuits as mentioned above. In operation, the instructions held in the registers are monitored and evaluated, and if conditions allow, the instructions are permitted to issue by the corresponding issue control signals, for example signals 40 and 41. Conditions examined include the availability of other CPU registers and data paths, and the status of the shared registers.

Access to each semaphore register cluster 151-155 is controlled according to the CPU issuing the instruction and the cluster number assigned thereto. Thus, in the case where one of the clusters 151-155 is sought to be read, a cluster number control signal is applied to gate 161 from control circuit 70 wherever the appropriate cluster is selected. Thus, a set or clear operation may be performed on one of the thirty-two semaphore bits in a cluster, and the thirty-two bits return the appropriate cluster 151-155 via the enter semaphore control signal applied thereto, as controlled by control 70 in response to the cluster number asserted by the CPU request in the operation.

As illustrated, gate 161 may also receive an input from the Sj data path via gate 160, through a register 182. Thus, where desired, it is possible to accomplish a parallel load of a semaphore register cluster through gate 161 and signal path 183, and a software instruction to effect the same is preferably provided for the CPUs. Similarly, the contents of any one of the semaphore registers in clusters 1-5 may be accessed via gate 161 and gates 162-165, via the Si data path. Incidentally, it shall be understood that data paths 20-23 as identified in FIG. 1 represent generally the Si, Sj, Ai and Aj data paths identified in FIGS. 3-5. As those skilled in the art will realize, these data paths are preferably physically distinct and are preferably routed to and from different registers within a CPU. Again, a software instruction is provided to effect the parallel read of a semaphore register. Thus, parallel load and parallel read instructions may be used for loading the registers at the beginning of a job or saving the registers contents at the end of the job's execution interval.

Access to any one of the five clusters of shared registers 100 are normally controlled solely by CPU software, which preferably utilize the semaphore registers to coordinate access and avoid conflicts since no reservations on the registers are made in the instruction issue control. However, request gating networks 75 does operate to prevent simultaneous access by more than one CPU on the same clock cycle to the registers thus providing a hardware interlock.

When a read or write instruction to the shared B and T registers 100 is permitted to issue, which process will be described in more detail below, the address from the CPU instruction parcel is conveyed through the local control and the request operation signal paths (for instance path 45) to control 70, which generates therefrom the address to the registers 100 via the address/write signal path, with a portion of the address being determined by the cluster number assigned to the referencing CPU. In the case of a write data instruction, gates 160, 170, 171 and 172 are appropriately controlled via the CPU select signal in the case of gates 160, 170, 171 and the Aj select signal in the case of 172, as generated by control 70. Sj data comprises a sixty-four bit wide word, which is gated through gates 160 and 170, which gate the respective upper and lower thirty-two bits. The Aj data path consists of a twenty-four bit wide path, and is handled by gate 171 alone. If the data to be written is to be acquired from the Aj data path the Aj select signal is activated to cause gate 172 to select from gate 171. Otherwise, the Sj data is gated through 172 to be combined with the data gated through gate 160 and register 182. All register 100 writes are sixty bits wide. Any bits undefined by Aj will be zeroed. In the case of a read instruction the cluster and address are similarly selected and gates 162-165 and 173-176 are controlled via the readout select signal generated by control 70 according to the selecting CPU and data path. Like in the case of Sj data, the Si data is handled through two sets of gates, with the upper and lower bits being handled by registers 162-165 and 173-176 respectively. As also shown in FIGS. 4 and 5, the real time clock (RTC) is also accessible via these gates.

Figure 2:
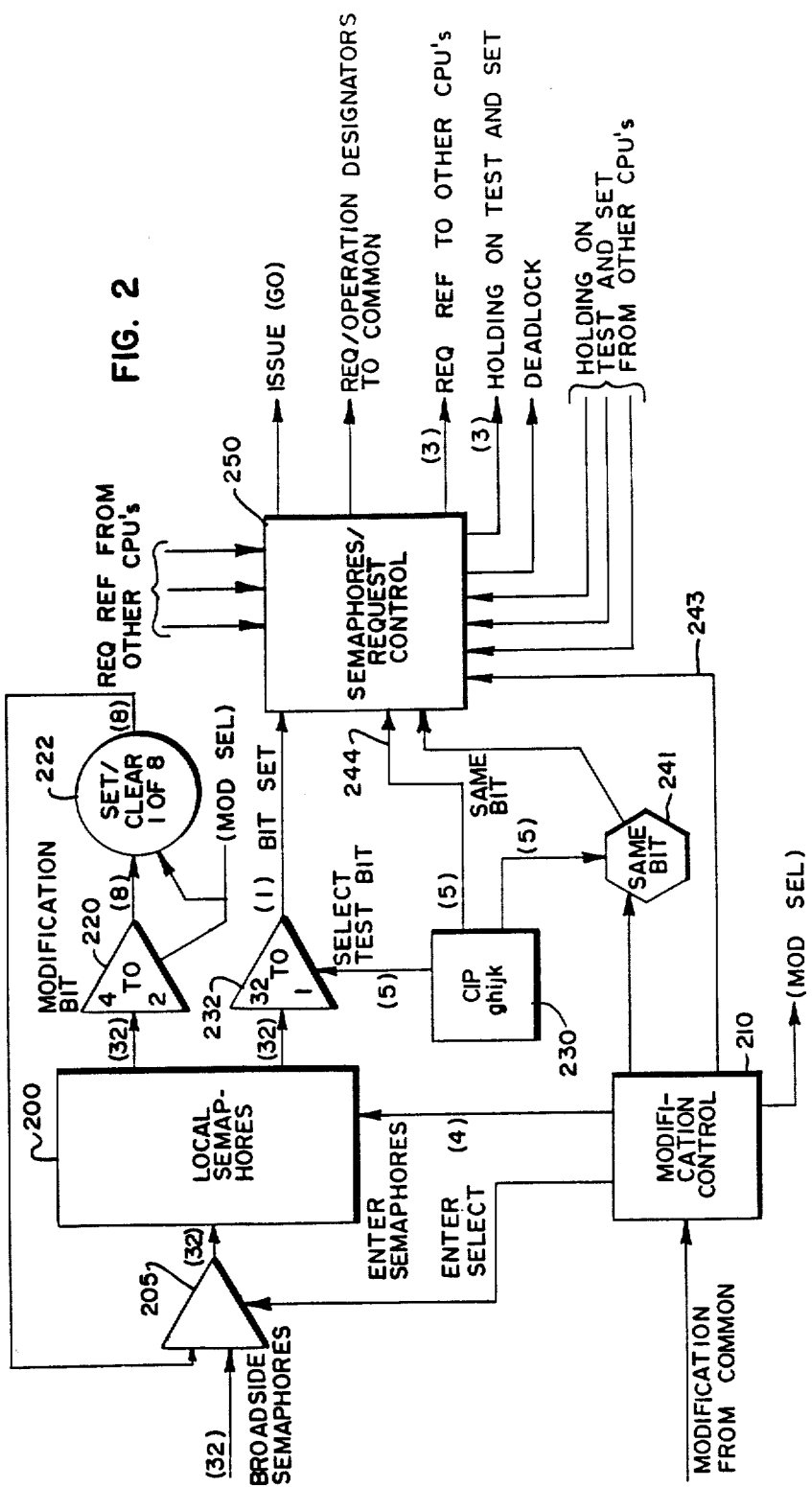
FIG. 2 is a schematic block diagram of the local control communication circuit according to the present invention.

As discussed with reference to FIG. 1, each CPU is associated with a local control circuit, for instance circuits 30 and 31. The primary purpose of the local control circuits, a more detailed diagram of which are shown in FIG. 2, is to facilitate fast execution of the CPU instructions directed to the semaphore or shared registers. The primary reason for the local control circuits is to minimize delays associated with propagation of signals to and from the common control circuit 10, which in the case of the preferred embodiment of the present invention is approximately a one clock period delay removed from the CPUs. So, an instruction issued by a CPU is not executed by common control circuit 10 until the following clock period, and any acknowledge or data returned thereby is likewise delayed an extra clock period. Accordingly, if a test and set instruction requiring an acknowledge back to the CPU before issuing was required to be executed in circuit 10, a minimum of a three clock period delay would be encountered by the issuing CPU before it was determined whether or not the instruction could be issued or would have to be held. The present invention, however, via the local control circuits, provides a means to avoid this delay under normal operating conditions with respect to operations performed in the semaphore registers. In FIG. 2, it can be seen that each local control circuit includes local semafore registers 200, which is a copy of the semaphore register cluster (151-155) assigned to the associated CPU. Local semaphores 200 may be parallel loaded or "broad-sided" through gate 205, which receives an input from the output of gate 161 (FIG. 5). Local semaphores 200 may also be modified under the control of modification control circuit 210, which receives a control signal from control 70 as shown in FIG. 3 and is reflected in FIG. 1. Modification control circuit 210 generates a modification select signal (MOD-SEL) which controls gate 220 and set clear circuit 222, via which any one of the thirty-two bits in register 200 may be set or cleared and reintroduced to the register via gate 205 under control of the enter select signal and the enter samephore signal, both of which are generated by control 210. The same operation will be done on registers 151 through 155 in FIG. 5 by control 70 and using gates 161 and 180.

Five bits of the current instruction parcel requesting a semaphore operation are held in register 230, which five bits identify which one of the thirty-two bits is to be tested. The data in register 230 is applied to gate 232 via the select test bit signal path, which selects one of the thirty-two bits to provide the bit set signal for application to semaphore/request control circuit 250. To address the situation where the bit sought to be tested is in the process of being modified by another CPU via modification control circuit 210, a same bit test circuit 241, compares the five bits identifying the bit to be modified derived from register 210 with the five bits identifying the bit to be tested derived from register 230. In the case where the bits are the same, the same is communicated to circuit 250 via the same bit signal path, and the status of the bit to be tested is communicated from control 210 to control 250 via signal path 243. Semaphore/request control circuit 250 further receives the contents of register 230 via signal path 244, and a request reference signal input from the other CPUs.

In operation, when an instruction is encountered requiring access to the shared resources, issue is held via circuit 250 for one clock period and a request, via request/operation designator signal (for instance signal 45) is sent to the common control. If at the end of the clock period there are no outstanding requests from other processors, as determined by the request reference signals from the other CPUs, the instruction is allowed to issue (providing all other conditions are met). If there is more than one processor making a request, the local control must wait for an acknowledge from the common control. In the case of a test and set instruction the local control requests the common control to set the bit as soon as the instruction is received. It should be noted that test and set instructions per se are not executed in the common control. Rather, the local control performs the test and instructs the common control to do the set. To issue a test and set instruction, during the one clock period that issue is held, the local control checks the local copy of the semaphore bit in question. If the bit is set in the local copy, the request to set the bit is retracted in the following clock period to the common control and the local control waits until there is a modification (by monitoring the bit set line) from the common control clearing the bit (initiated by another processor), and then the request is set again and the sequence continues as if it is the first "hold" clock period. During the time that the request is retracted and the local control is waiting for the bit to clear, a signal is sent from the local control to all other processor local controls signifying that the processor is stopped on a test and set. This is the holding on test and set signal produced by semaphore/request controls circuit 250. As will be described below in more detail, this and other signals will be used to determine a deadlock situation.

As mentioned above, the common control circuit 10 receives requests and executes them. In the case where more than one CPU is attempting access at the same time, the conflicts are arbitrated via the scanner signal 80 and gates 75. If only one processor is requesting access during a clock period, it is assumed by both the local and common control that the request will be executed in the next clock period, such that no further communication for issue is necessary. If more than one request is present in a clock period, the scanner chooses the request to be honored and it acknowledges from the common control to the local control whose request was accepted. Due to the fact that the common control is one clock period away from the local control, the common control will only accept a request every other clock period maximum rate, as mentioned above. This provides that any modifications made to a semaphore will have time to propagate back to the local control before the local control's request will be allowed. The common control also tells each local control what other processors are in the same cluster as itself. This, in conjunction with the holding on test and set signal mentioned above, permits a processor to determine whether a deadlock is occuring.

Set or clear instructions are issued without regard to the status of the semaphore bits in local control 30. When issued, as determined by the availability of common control circuit 10, the appropriate semaphore bit in one of the clusters is set or cleared via circuits 161 and 180. In the same clock period control 70 will convey to modification control 210 that the local copy of the semaphore must be updated in the next clock period for each processor in the same cluster as the semaphore bit set or cleared. Thus, the identity of the modified bit is available to the local control in the same clock period as it is modified in the common control (although the local copy is not yet updated) allowing semaphore request-/control 250 to make a decision on whether to set or retract a request which pertains to the modified bit without delay.

It should be emphasized that test and set instructions are handled differently than all other instructions in that the actual operation is in part performed in the local control (the test) and in that they may be conditionally issued (set operation) to the common control. This is provided for the special case of test and set instructions because they are only issued conditionally (as opposed to the other instructions) and thus require an acknowledge signal (i.e. indicating that the bit is clear to be set) before they can proceed. Accordingly, by providing the local and common control arrangement of the present invention test and set instructions can be issued (assuming no other conflicts) the same clock period as produced by the CPU without the delay (associated with propagation) which would be required to send a request to the common control and wait for an acknowledgement. This can amount to a substantial time savings advantage because in most circumstances, thought to be in the ninety plus percent range, no impediment to issue will be present.

Aside from test, set and clear instructions, an instruction is provided for use by the operating system to change the contents of the cluster number registers (not shown) in each of the CPUs so that it has access to all clusters. The contents of the cluster number register can be changed by this instruction only if the CPUs are operating in the monitor mode, as determined by the active exchange package for the CPU.

To accommodate the execution of a multiprocessing task by a single CPU and to eliminate the possibility of a CPU holding issue on a test and set instruction indefinitely, a deadlock interrupt mechanism is provided, as mentioned above. A deadlock interrupt may be present in either one of two situations. In one situation, a CPU is holding issue on a test and set and there are no other processors assigned to the same cluster. Accordingly, in such a situation it is not possible for another CPU to access and clear the selected semaphore bit and allow the holding CPU to continue. In this case a deadlock interrupt will be generated via the local control, as determined by the cluster assignments of other CPUs and any corresponding holding on test and set signals. In response to the interrupt and exchange of the job in the deadlock CPU will be effected so that processing may continue. In the second situation all CPUs in the same cluster are holding issue on a test and set instruction. In this deadlock condition, the deadlock interrupt will similarly exchange the currently executing jobs in all CPUs so that processing may continue.

Thus, the communication circuit of the present invention provides a "tightly-coupled" fast communication path between CPUs for address or scalar data and for control and protection of shared data resources. The cluster arrangement of the semaphore registers and the B and T registers provide the ability to run some multiprocessor jobs on only one CPU and permits one cluster to be reserved for use by the operating system. The tight-coupling communication circuits of the present invention and thereby eliminates the need for slower and more complex software protection methods and significantly reduces the need to communicate through the substantially slower central memory path.

Preferably, all processors are identical and symmetric in the programming functions and may operate independently to perform independent tests of different jobs or may be "clustered" to perform related tasks of a single job. In clustered operation, one or more processors may be assigned to a particular set or cluster of registers. Each set of registers or cluster thus provides memory registers for passing data and semaphore registers for coordinating control. In the preferred embodiment, there are four processors and five clusters of shared registers such that each processor may be assigned to its own unique set of shared registers with one cluster reserved for the operating system. However, it will be understood that the invention is not limited to a four processor system, but may be employed for any number of processors P or P+1 sets of shared registers are provided.

Multitasking in the present invention may be accomplished either through the shared or central memory (not shown) or through the shared registers, or a combination of both. Tasks accomplished in the former manner may be said to be "loosely coupled" while tasks accomplished in the later manner may be said to be "tightly-coupled". For tightly-coupled operation, should registers reduce the overhead of task initiation to the range of one microsecond to one millisecond, depending on the granularity of the tasks and software implementation techniques. In the case of loosely coupled operation, communication through the central memory may be synchronized or coordinated through the shared registers, and in particular the semaphore registers.

Thus, it will be seen that the organization of the present multiprocessor system provides a flexible architecture for processor clustering. The architecture allows a cluster of K processors to be assigned to perform a single task by the operating system whereby the processors may share data and synchronization registers for tight coupling communication. Further, each processor in a cluster may run in either monitor or user mode is controlled by the operating system and can asynchronously perform either scalar or vector operations dictated by programming requirements. Still further, any processor running in monitor mode can interrupt any other processor and cause it to switch from user mode to monitor mode allowing the operating system to control switching between tests.

Although the invention has been illustrated with respect to details of its structure and function, it shall be understood that changes may be made in detail in structure without departing from the spirit and scope of the invention as set forth in the claims apended hereto.

What is claimed is:

1. A method of inter-processor communication in a multiprocessor data processing system in which each processor includes internal paths for control and data information and which includes a plurality of common registers which are accessible by any one of the processors through said internal paths at rates commensurate with intra-processor operation and which further includes for each processor a plurality of local registers connected thereto, said method comprising the steps of:
 (a) organizing said common registers into a plurality of clusters, said registers for holding information indicative of the operational status of software tasks being executed by the processors;
 (b) restricting the access of each processor to no more than one of said clusters;
 (c) communicating between different processors permitted to access the same cluster by setting or clearing individual bits of the status information maintained in individual ones of the associated common registers;
 (d) maintaining in said plurality of local registers connected to each processor a local copy of the status information held in the cluster of common registers to which the respective processor has access;
 (e) signalling said local registers that the status information held in the cluster of common registers has changed;
 (f) controlling the issue of a test and set instruction by a processor by testing the status of the selected bit in said local copy and causing said instruction to issue immediately and causing the corresponding bit to be set in said corresponding common register if said bit in said local copy is clear and causing said instruction to hold on issue if said bit is set until the corresponding bit is cleared in the common register and the local registers are signalled of such change.

2. A method of inter-processor communication in a multiprocessor data processing system which includes a plurality of common semaphore registers which are accessible by any one of the processors at rates commensurate with intra-processor operation and wherein each processor has connected thereto a plurality of local semaphore registers, said method comprising the steps of:
 (a) organizing said common semaphore registers into a plurality of clusters;
 (b) restricting the access of each processor to no more than one of said clusters;
 (c) communicating between different processors restricted to the same cluster by setting or clearing individual bits of the status information maintained therein;
 (d) maintaining in said plurality of local semaphore registers connected each processor a local copy of the status information held in the respective processor's associated cluster;
 (e) signalling said local semaphore registers that the status information held in the cluster of common registers has changed;
 (f) controlling the issue of a test and set instruction by a processor by testing the status of the selected bit in said local copy and causing said instruction to issue immediately and causing the corresponding bit to be set in said corresponding common information register if said bit in said local copy is clear and causing said instruction to hold on issue if said bit is set until the corresponding bit is cleared in the common information registers and the local semaphore registers are signalled of such change.

3. An inter-processor communication system for a multiprocessor data processing system in which each processor includes internal paths for control and data information, said communication system comprising:

(a) a common control circuit including a plurality of clusters, each cluster including common semaphore registers and information registers all connected to said internal paths for accessing by any one of said processors;

(b) each of said processors including a cluster code register connected to said common control circuit by said internal paths, said cluster code register containing a cluster code indicative of which, if any, of said clusters the processor may access, and including means for communicating said cluster code from the processor to said common control circuit through said internal paths, each of said processors further including means for issuing instructions to access said common semaphore registers and said information registers in said common control circuit;

(c) a local control circuit connected to each processor and in relatively close physical proximity to its respective processor as compared to said common control circuit, said local control circuit for monitoring and controlling the issue of instructions to access from its respective processor to said common semaphore registers and said information registers in said common control circuit, said local control circuit including a plurality of local semaphore registers;

(d) said common control circuit further including means for communicating the data in the common semaphore registers in any one of said clusters to the local semaphore registers of the local control circuits of all of said processors which may access said cluster so that the local semaphore registers contain a copy of the data in the corresponding common semaphore registers; and (e) each of said local control circuits further including means for testing the status of a bit in any of said local semaphore registers in response to a processor instruction requesting that the corresponding bit in the common semaphore registers in said common control circuit be tested and set and for providing the immediate issue of said processor instruction and for causing said corresponding bit to be set in said common control circuit in the case where said bit is clear and the instruction may issue and for holding said processor instruction in the case where said bit is set and the instruction may not issue.

4. A multiprocessor system comprising:

a plurality of processing machines each having internal information paths;

a plurality of clusters, each cluster including common information registers and common semaphore registers, each of said information registers connected to permit accessing by any one of said processors through said internal paths, each of said semaphore registers connected to permit the setting or clearing of individual bits therein through said internal paths;

each of said processors including programmable access control means for restricting access to no more than one of said clusters;

means for programming said access control means;

local control means connected to each of said processors for monitoring instructions requiring operations in said common semaphore and information registers issued by its respective processor and controlling issue thereof, said local control means including a plurality of local semaphore registers and means for determining whether a common semaphore register in the cluster which its respective processor may access is busy, said local control means issuing set and clear instructions unconditionally to said common semaphore registers provided that they are not otherwise busy;

said plurality of clusters further including means for communicating the data in the common semaphore registers in any one of said clusters to the local semaphore registers of the local control means of all of said processors which may access said cluster so that the local semaphore registers contain a copy of the data in the corresponding common semaphore registers and including means for modifying the copy of data contained in the local semaphore registers;

said local control means further including means for testing the contents of said copy of data in the local semaphore registers in response to a processor instruction requesting a test and set operation and generating a set instruction to said common semaphore registers and permitting the instruction to issue if the tested bit is clear, and otherwise causing said processor to hold issue on said test and set instruction until said copy of data in the local semaphore registers is modified to reflect the clearing of the tested bit in the common semaphore registers;

each of said local control means further including deadlock interrupt means connected to said internal information paths for monitoring the holding of test and set instructions by the other processors and for causing one of said processors to be interrupted when there is no possibility that a particular one of said processors will be permitted to issue the test and set instruction which it is waiting to issue.

* * * * *